C. D. HASKINS.
ELECTRIC HEATER.
APPLICATION FILED JUNE 23, 1909.

963,892.

Patented July 12, 1910.

Witnesses:
J. Ellis Glen
J. Earl Ryan

Inventor
Caryl D. Haskins,
by Albert H. Davis
Atty.

UNITED STATES PATENT OFFICE.

CARYL D. HASKINS, OF SCHENECTADY, NEW YORK, ASSIGNOR TO GENERAL ELECTRIC COMPANY, A CORPORATION OF NEW YORK.

ELECTRIC HEATER.

963,892.  Specification of Letters Patent.  Patented July 12, 1910.

Application filed June 23, 1909. Serial No. 503,814.

*To all whom it may concern:*

Be it known that I, CARYL D. HASKINS, a citizen of the United States, residing at Schenectady, in the county of Schenectady, State of New York, have invented certain new and useful Improvements in Electric Heaters, of which the following is a specification.

This invention relates to electric heaters and has for its object the provision of a device of this character in which the joint between the active heating element and the vessel or other device to be heated is made so as to produce an intimate thermal relationship between the parts and thereby increase the efficiency of the heater as a whole.

One of the greatest difficulties encountered in the construction of electric heating devices is the production of an efficient contact between the active heating element and the utensil or body to be heated. Moreover, the most desirable type of heater for ordinary service is one in which the utensil is not directly attached to the electric circuit; that is, one in which the utensil is heated on an electrically heated stove. In this form of heating apparatus, the contact between the heating element and the utensil is at its worst.

One of the objects of my invention is to improve the contact between the utensil and the heating element.

In carrying out my invention, I embody in a heater a material which is softened or rendered plastic or even fluid by the heat developed in the heater. By softening the material, a very intimate thermal relation is produced between the softened material and the heating element. I have found that by having the heating surface of the fusible material so arranged that the utensil to be heated rests upon and sinks into it, a very efficient heating joint is produced. I have also found that by covering the material with a shield or screen the softened material is kept from spilling.

Figure 1:
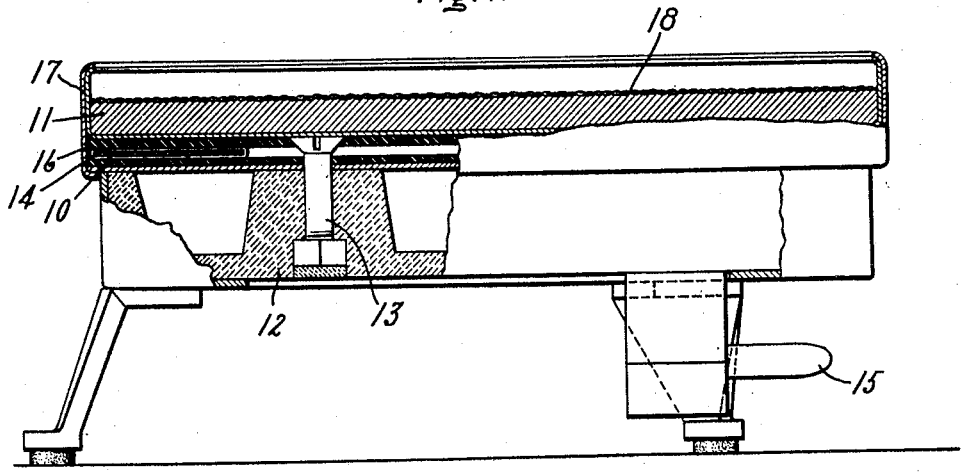
Figure 2:
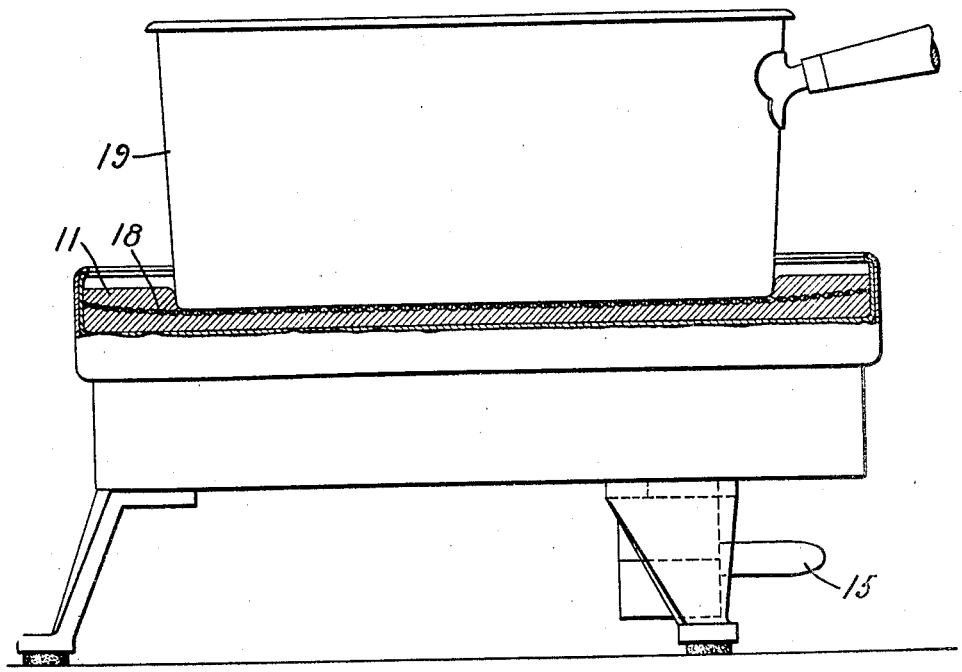

In the accompanying drawing, in which I have shown my invention embodied in concrete form for the purpose of illustration, Figure 1 represents a side elevation, partly in section, of the heater, and Fig. 2 represents a similar view with a cooking utensil in place on the heater.

Referring to the drawing, 10 represents a heating element which is arranged in the form of a flat ring, with a fusible material 11 in intimate thermal relation therewith. The particular arrangement of the heating element and its specific relation to the fusible material forms no part of my invention, but for the purpose of illustration I have shown a unit of the type described and claimed in the application filed by Logan and Faccioli on November 27, 1908, Serial No. 464,517. In this form of unit there is provided an insulating base 12 preferably circular in form to which the heating unit is secured by means of bolts 13. In the form in which I have shown the unit, the resistance conductor 10 is wound spirally around a ring 14 of insulating material, such, for instance, as mica, and the terminals brought out at the pins 15. This ring with the conductor wound upon it is then clamped between two sheets of mica 16 and inclosed in a sheet metal casing and the whole secured to the base 12 by the bolts 13. The upper surface of the unit is then covered with the fusible metal 11. This is held in place by the metallic rim 17 which is permanently secured to and forms part of the heater by being bent around the heating element as shown. This rim forms a well or dish for containing the fusible metal. The particular material which is used for this purpose forms no part of my invention and may be varied as desired, depending upon the temperature at which it is desired that the material shall soften. I have found, for instance, that an alloy of tin, cadmium and bismuth can be formed, which will become soft or plastic at 110° C. and will be quite fluid at 125° C. This alloy, moreover, does not show surface oxidation after heating. In order to prevent the material which has softened from spilling, I provide a shield 18 which normally covers the metal, as shown in Fig. 1, and which is adapted to be forced down into the metal when the utensil 19 rests upon it. This shield may be a fine metal gauze or may be constructed in any suitable manner. It will be observed that when current is passed through the heating unit and the utensil 19 is placed upon the fusible metal, the latter softens and the receptacle sinks down into the metal so as to form a sort of a bead around the bottom edge of the receptacle by the metal rising around it. This produces a very efficient joint between the heating unit and the utensil, filling all gaps due to warping or other causes. When the receptacle is removed, the shield which has been forced down with the utensil, as shown, will return to its original position and the fusible metal will harden when the current is turned off.

I have shown my invention for the purposes of illustration as embodied in a stove having a flat heating surface and the utensil arranged to engage the same, but it should be understood that I do not limit my invention thereto. It is obvious that the heating apparatus may be of any desired form and arranged to accommodate any other device or body to be heated, instead of a cooking utensil, the underlying idea being the production of a heating device in which the joint between the active heating element and the body to be heated is in a plastic or fluid form. Various modifications of my invention will, therefore, suggest themselves to those skilled in the art, without departing from the spirit of my invention, the scope of which is set forth in the annexed claims.

Having now fully described my invention, what I claim as new and desire to secure by Letters Patent of the United States is:

1. An electric heater having a heating surface which is softened by the heat developed in said heater.

2. An electric heater having a heating surface which is rendered plastic by the heat developed in said heater.

3. An electric heater having a material in thermal relation with the heating element which is softened by the heat developed in said element.

4. An electric heater comprising a flat heating unit having its effective heating surface covered with a material which is softened by the heat developed in said unit.

5. An electric heater having a heating surface composed of a material which is softened by the heat developed in said heater and a body to be heated arranged to sink into said softened material.

6. An electric heater having a heating surface which is softened by the heat developed in said heater and a shield normally covering said surface and arranged to sink into the softened surface.

7. An electric heater having a heating surface composed of a material which is softened by the heat developed in said heater, a shield normally covering said surface and a vessel to be heated arranged to engage said shield and sink into the softened material.

8. An electric heater comprising a flat heating unit having its effective heating surface covered with a material which is rendered fluid by the heat developed in said heater, a shield normally covering said material and a vessel to be heated arranged to engage said heater and sink into the softened material.

In witness whereof, I have hereunto set my hand this 22nd day of June, 1909.

CARYL D. HASKINS.

Witnesses:
BENJAMIN B. HULL,
HELEN ORFORD.